United States Patent
Lincourt et al.

(10) Patent No.: US 6,458,393 B1
(45) Date of Patent: Oct. 1, 2002

(54) COTTAGE CHEESE HAVING POROUS CURD

(75) Inventors: Richard H. Lincourt, Mundelein; Wen-Sherng Chen, Glenview; Ragendra P. Borwankar, Addison, all of IL (US)

(73) Assignee: Kraft Foods, Inc., Northfield, IL (US)

( * ) Notice: Subject to any disclaimer, the term of this patent is extended or adjusted under 35 U.S.C. 154(b) by 0 days.

(21) Appl. No.: 09/479,761

(22) Filed: Jan. 7, 2000

Related U.S. Application Data

(60) Provisional application No. 60/117,577, filed on Jan. 27, 1999.

(51) Int. Cl.[7] .................. A23C 19/076; A23C 19/02
(52) U.S. Cl. .................. 426/36; 426/34; 426/38; 426/39; 426/582
(58) Field of Search ................. 426/34, 36, 38, 426/39, 582

(56) References Cited

U.S. PATENT DOCUMENTS

| | | | | |
|---|---|---|---|---|
| 2,519,606 A | * | 8/1950 | Sharp | 530/361 |
| 3,117,870 A | * | 1/1964 | Hussong et al. | 426/40 |
| 3,411,920 A | * | 11/1968 | Holder et al. | 426/39 |
| 3,591,390 A | | 7/1971 | Flickinger | 99/115 |
| 3,635,734 A | | 1/1972 | Williamson et al. | 99/116 |
| 3,645,751 A | | 2/1972 | Wakeman | 99/116 |
| 3,851,795 A | | 12/1974 | Anderson | 222/1 |
| 3,918,356 A | * | 11/1975 | Fischer et al. | 99/452 |
| 3,963,836 A | | 6/1976 | Henson et al. | 426/40 |
| 4,110,484 A | | 8/1978 | Rule et al. | 426/582 |
| 4,232,051 A | * | 11/1980 | Hinds, Jr. et al. | 426/582 |
| 4,482,575 A | | 11/1984 | Olds | 426/582 |
| 4,770,882 A | | 9/1988 | Ingouf et al. | 426/36 |
| 4,948,613 A | | 8/1990 | Bernard et al. | 426/564 |
| 4,981,703 A | | 1/1991 | Fabricius | 426/36 |
| 4,989,504 A | * | 2/1991 | Jay | 99/455 |
| 5,194,283 A | | 3/1993 | Dupas et al. | 426/582 |
| 5,232,720 A | | 8/1993 | Nielsen | 426/39 |
| 5,432,265 A | * | 7/1995 | Tomasula | 530/361 |
| 5,472,718 A | | 12/1995 | Ijsseldijk et al. | 426/38 |
| 5,547,691 A | | 8/1996 | Kjaer et al. | 426/36 |
| 5,985,347 A | * | 11/1999 | Ejnik | 426/519 |
| 6,258,391 B1 | * | 7/2001 | Van Hekken et al. | 426/36 |

FOREIGN PATENT DOCUMENTS

| | | | |
|---|---|---|---|
| JP | 56039744 A | * | 9/1979 |
| JP | 35700875-a | * | 1/1982 |
| WO | WO 9920120 | * | 4/1999 |

* cited by examiner

*Primary Examiner*—Milton I. Cano
*Assistant Examiner*—Robert Madsen
(74) *Attorney, Agent, or Firm*—Fitch, Even, Tabin & Flannery

(57) ABSTRACT

The present invention is directed to cottage cheese having a more porous curd. The resulting curd is less dense than conventional cottage cheese curd. The more porous cottage cheese curd allows the cottage cheese dressing to permeate the curd. The porous cottage cheese curds formed according to the present invention allow greater absorption of the dressing, and thus significantly reduce the problem involving the curds "swimming" in the dressing often found in conventional cottage cheese products. Methods for manufacturing such cottage cheese also are provided. More specifically, the porous cottage cheese curd is prepared by the generation or introduction of gas during the initial formation of the curd.

12 Claims, 1 Drawing Sheet

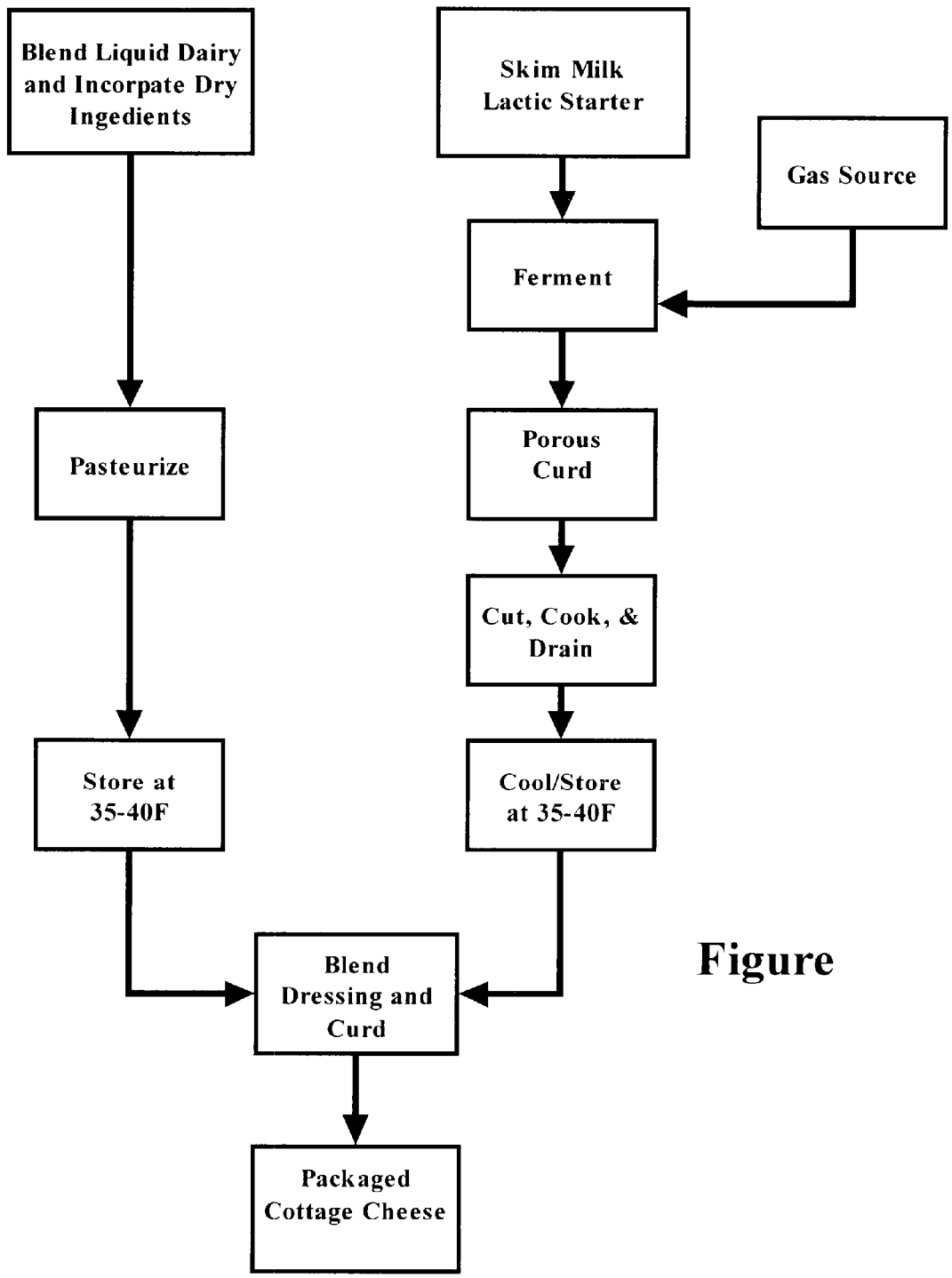
Figure

COTTAGE CHEESE HAVING POROUS CURD

RELATED APPLICATION

This application is based on, and claims benefit of, U.S. Provisional Application Serial No. 60/117,577, filed on Jan. 27, 1999.

FIELD OF THE INVENTION

The present invention is directed to cottage cheese having a more porous curd. The more porous cottage cheese curd allows the cottage cheese dressing to more fully permeate the cottage cheese curd. Methods for manufacturing such cottage cheese are also provided. More specifically, the porous cottage cheese curd is prepared by the generation of gas during the initial formation of the curd or by sparging with a gas during the initial formation of the curd. The resulting gas permeated cottage cheese curd allow the formation of a less dense cottage cheese curd. The porous cottage cheese curds formed according to the present invention allow greater absorption of the dressing and, thus, alleviate or significantly reduce the problem involving the curds "swimming" in the dressing often found in conventional cottage cheese products.

BACKGROUND OF THE INVENTION

Cottage cheese is a soft, mild acid-coagulated uncured cheese made primarily from a milk source. Cottage cheese is made up of relatively small pieces or particles of cottage cheese curd which are suspended in, or blended with, a creamy dressing. In a conventional manufacturing process, a milk source (i.e., full fat, reduced fat, or skim milk depending on the level of fat desired) is pasteurized and homogenized. After cooling (normally to about 90 to about 98° F. ), the milk source is inoculated with conventional lactic acid-generating culture. Rennet may also be used to aid the coagulation. The mixture is typically held at the inoculation temperature until it has ripened and a coagulum is formed. The acidity of the coagulum is from about 0.7% to about 1% (calculated as percent equivalent lactic acid).

After the coagulum has been formed and the desired acidity is obtained, the curd is cut into small pieces with agitation. The cut curd is heated to about 120 to about 130° F. and held at that temperature for about 100 to about 140 minutes. The curds are then separated from the whey. The curds are then suspended in, or blended into, a creamy dressing to form the cottage cheese product. The resulting cottage cheese product is then normally dispensed into retail containers and then refrigerated.

Low-fat and fat-free cottage cheeses are known in the art to provide substantial amounts of protein to the consumer with an accompanying low level of fat, and thus is a desriable source of protein in many health-conscious individuals diet. Such consumers generally prefer a creamy product in which the curds and dressing are blended together. In other words, consumers prefer cottage cheeses in which the curds do not appear to be "swimming" in the dressing. Such "swimming" effect is often observed when the curds and dressing tend to separate in the container. The curds and dressing can be mixed prior to serving to at least alleviate the problem; in many cases, however, such mixing can not significantly overcome the problem. It would be desirable, therefore, if cottage cheese could be produced in which the separation or "swimming" problem is eliminated or at least substantially reduced.

SUMMARY OF THE INVENTION

Generally, the present invention is directed to a cottage cheese having a more porous cottage cheese curd and methods for making such cottage cheese. The improved cottage cheese products of the present invention are less likely to separate into separate phases (i.e, where the curds are said to "swim" in the dressing) and have significantly lower densities than conventional cottage cheese. The present invention provides a cottage cheese curd which readily adsorbs the dressing and thus does not "swim" in such dressing. The cottage cheese curds are prepared by providing a gas source whereby a gas is introduced into the milk source during the fermentation process while the curd is actually formed. One especially preferred method of generating the gas is the addition of sodium bicarbonate to the milk source so that carbon dioxide is generated as the curd is formed. The use of sodium bicarbonate generally allows the most porous curd. Other gases can, however, be introduced during the fermentation process to provide the desired porous curd.

One object of the present invention is to provide an improved cottage cheese product comprising a blend of a cottage cheese dressing and a cottage cheese curd, wherein the cottage cheese curd is porous and wherein the cottage cheese dressing is able to permeate the porous curd. Another object of the present invention is to provide a process for preparing an improved cottage cheese product having porous cottage cheese curd, said process comprising (1) preparing a cottage cheese dressing at a pH of about 5.6 to about 6.0;

(2) preparing a porous cottage cheese curd at a pH of about 4.0 to about 4.8, wherein the porous cottage cheese curd is prepared in a fermentation mixture using a gas source to provide a gas to the fermentation mixture during the formation of the curd, whereby the gas forms pores within the curd; and (3) blending the cottage cheese dressing and the porous cottage cheese curd together to form the improved cottage cheese product. These and other objects and advantages of the present invention were be apparent to those skilled in the art upon a consideration of the present specification.

BRIEF DESCRIPTION OF THE DRAWING

The FIGURE provides a schematic diagram of the process of this invention for the production of a cottage cheese product having a porous curd.

DETAILED DESCRIPTION OF THE INVENTION

The present invention provides an improved cottage cheese product having a more porous curd. The porous curd is formed using a gas source during the fermentation of the milk source and the formation of the curd. The gas introduced into the curd to form the more porous curd and which may still be present in the curd is subsequently removed or driven off during the cooking of the curd. Use of the gas during fermenting and, perhaps, removal of gas during cooking, leaves the curd voids throughout its structure and, therefore, an increased level of porosity. The increased level of porosity allows, once the cottage cheese dressing and cottage cheese curd are blended together, penetration of the dressing into at least some of these voids and provides an improved cottage cheese product with a flexibility of varying curd/dressing ratios as desired. These factors appear to combine to form a cottage cheese which, to a large extent, appears to eliminate or at least substantially reduce the problem of curds "swimming" in the dressing often observed with conventional cottage cheese.

In a preferred embodiment of the invention, the porous cottage cheese curd is prepared from a milk source, an acid source, and a source of gas to permeate the cottage cheese curd during its formation. The milk source can be any conventional liquid milk including, for example, full-fat, reduced-fat, and skim milk or reconstituted full fat, reduced fat, and non-fat dry milk powder. The acid source can be any conventional lactic acid-producing culture or other conventional acid source normally used in cottage cheese production. Preferred lactic acid-producing cultures include *Streptococcus lactis, Streptococcus cremoris, Lactococcus lactis, and/or Lactococcus cremoris*. Other acid sources include, for example, lactic acid, phosphoric acid, citric acid, hydrochloric acid, gluccono-δ-lactone, and other edible acids.

The gas source can be a gas sparged or otherwise passed through the milk source and acid source mixture or an inorganic material that will form a gas during the fermentation step. Suitable gas for sparging include, for example, air, nitrogen, carbon dioxide, and the like. Carbonated water can also be used as a gas source. The use of sodium bicarbonate as the gas source is especially preferred since such a gas source is capable of generating a more porous curd. Under the acid conditions of the fermentation, sodium bicarbonate will generate carbon dioxide throughout the mixture, including the internal portions of the forming curd. Thus, sodium bicarbonate is expected to provide a more homogenous and more extensive pore structure within the curd that the gas sparging technique.

Generally, the amount of sodium bicarbonate included in the fermentation mixture is about 0.1 to about 1.0 percent, more preferably about 0.2 to about 0.5 percent. It is generally preferred that the sodium bicarbonate is introduced in a fine particulate form to form a more homogenous distribution as the curd is formed and more readily dissolve in the water-based mixture. Sodium bicarbonate could be added directly to the fermentation vat during fermentation or, more preferably, added to, and blended into, the milk and lactic starter mixture before fermentation occurs.

As noted, the gas source can also be a gas introduced or injected directly into the fermenting milk and lactic starter mixture. Such gases can be introduced using conventional sparging or gas injection equipment. If used, the cheese fermentation vat should be modified to allow gas sparging and to insure substantially uniform distribution of the gas throughout the fermenting mixture and process. Gas sparging should preferably begin before significant curd formation has begun. Introduction of such gas only during portions of the fermentation process would allow control of the degree of porosity of the curd. Generally, the gas sparged through the fermentation mixture should have a bubble size of about 0.005 to 2 cm, preferably about 0.01 to about 0.5 cm. Of course, other bubbles sizes and bubbles of different sizes at the same time could be used if desired.

One preferred process for producing the cottage cheese of the present invention is illustrated in the FIGURE. The process can be divided into a "dressing side" or part of the process (left side of the FIGURE) and the "curd side" or part of the process (right side of the FIGURE). Considering first the dressing side, liquid dairy products, including for example, skim milk, condensed skim milk, and cream, are blended with the dry ingredients, including, for example, salt, and food starch. The blended ingredients are then pasteurized under conventional pasteurization conditions (e.g., about 164 to about 167° F. for about 15 to 30 seconds). After pasteurization, the dressing is cooled to about 35 to about 45°° F., preferably about 400° F., and held until blending with the cottage cheese curd. Preferably, the cooled dressing is maintained under continuous mixing or agitation to prevent settling of any insoluble or partially soluble components. The pH of the dressing is generally about 5.0 to about 6.5, preferably about 5.5 to about 6.0, and most preferably about 5.8.

The preparation of the cottage cheese curd is illustrated on the "curd side" of the FIGURE. The cottage cheese curd can be prepared before, after, or during the preparation of the dressing. Using conventional techniques, pasteurized liquid milk (preferably reduced fat or skim milk) is blended with a suitable lactic acid starter in a cheese vat. Preferably, about 0.5 to about 5 percent, and more preferably, about 1 to about 1.5 percent of the lactic acid starter is added to the pasteurized liquid milk. The mixture is then fermented or incubated at a temperature of about 85 to about 100° F., preferably at about 90° F., until a pH of about 4.6 is reached (i.e., the milk has set). During fermentation, the mixture is sparged with a gas source or a gas is generated in situ. Generally, the fermentation is carried out for about 200 to about 400 minutes; gas treatment can generally be stopped once the fermentation is complete. Introduction of the gas during fermentation (i.e., as the curd is formed) results in a porous curd. Once the milk has set (i.e., the porous curd has formed), the porous curd is cut and then cooked, for example, at a temperature of starting at about 120 and rising to about 140° F. Essentially any residual gas from the fermentation step will be driven off cuing the cooking step. After cooking, the curd is drained and then washed using chlorinated (about 8 ppm) ice water. Once cooled to about 40° F., the curd is drained. The cooled, drained curd can be used immediately or held at about 40° F. until needed.

The cooled porous curd and cooled dressing (both at about 35 to about 40° F.) are then blended gently together while maintaining the temperature at about 35 to about 40° F. Preferably a low-shear device such as a ribbon type blender is used. Generally, about 35 to about 45 percent dressing and about 55 to about 65 percent curd are used. After blending (normally for about 5 to 15 minutes), the resulting cottage cheese product is packaged in suitable, and preferably sealable, containers and stored at suitable refrigeration temperatures. At packing, the pH will normally be in the range of about 4.3 to about 5.3. After such cold packing, the pH of the cottage cheese will normally decrease to about 4.5 to about 5.1.

The following examples are intended to illustrate the invention and not to limit it. Unless noted otherwise, all percentages are by weight.

EXAMPLE 1

This example illustrates the preparation of a cottage cheese product having porous curd prepared using sodium bicarbonate as the gas source. The following formulation was used to prepare a porous cottage cheese curd:

| Ingredient | Percentage | Weight (g) |
| --- | --- | --- |
| Skim Milk | 90.0 | 360 |
| Condensed Skim Milk | 2.1 | 8.5 |

-continued

| Ingredient | Percentage | Weight (g) |
|---|---|---|
| Lactic acid Producing Starter | 6.0 | 24 |
| Distilled Water | 1.5 | 6.0 |
| NaHCO$_3$ | 0.4 | 1.5 |

The skim milk and condensed skim milk are mixed in a closed chamber. To this mixture is added the lactic acid-producing starter culture with stirring. The resulting mixture is heated to about 98° F. and allowed to ferment for about 5 hours. The NaHCO$_3$ is dissolved in the distilled water, and added to the fermented milk mixture before fermentation begins. The pH of the resulting curd is about 4.6–4.7. The sodium bicarbonate in the presence of the acidic milk culture during fermentation permits the evolution of $CO_2$ gas, resulting in a porous cheese curd. The porous cheese curd is cut with curd knives using agitation. The resulting porous cheese curd particles are cooked to about 125° F. for approximately 2 hours. The cut, porous cheese curd is cooled to approximately 40° F. The porous curd is collected by filtering. The porous cottage cheese curd can be blended with a cottage cheese dressing. Generally, about 35 to about 45 percent dressing and about 55 to about 65 percent curd are used to form the cottage cheese.

EXAMPLE 2

Control and inventive curd products were prepared as described in Example 1 except that, for the inventive products, the amount of added sodium bicarbonate was varied. Of course, no sodium bicarbonate or other gas was used during fermentation of the control sample. The effect of the added sodium bicarbonate on the density of the resulting cottage cheese curd is indicted in the table below. The average values (with standard deviations) were based on 5 separate samples for each data point.

| NaHCO$_3$ Added (%) | Density (g/cm$^3$) |
|---|---|
| 0 (control) | 0.988 ± 0.011 |
| 0.125 | 0.972 ± 0.022 |
| 0.25 | 0.951 ± 0.021 |
| 0.375 | 0.865 ± 0.039 |
| 0.5 | 0.757 ± 0.043 |
| 0.625 | 0.658 ± 0.048 |
| 0.75 | 0.594 ± 0.026 |

As can be seen in this Table, the density of the resulting cottage cheese curd drops as the amount of sodium bicarbonate increases.

EXAMPLE 3

This example illustrates the preparation of porous cottage cheese curd using $CO_2$ gas as the gas source. The following formulation was used to prepare a porous cottage cheese curd:

| Ingredient | Percentage | Weight (g) |
|---|---|---|
| Skim Milk | 90.0 | 360 |
| Condensed Skim | 2.1 | 8.5 |

-continued

| Ingredient | Percentage | Weight (g) |
|---|---|---|
| Milk | | |
| Lactic acid Producing Starter | 6.0 | 24 |
| Distilled Water | 1.9 | 7.5 |

The skim milk and condensed skim milk are mixed in a pressure vessel. To this mixture is added the lactic-acid producing starter culture with stirring. The resulting mixture is heated to about 98° F. $CO_2$ is added under 30 psi pressure to the chamber. After the curd sets up, the gas pressure is released and returned to 1 atmosphere. The pH of the curd is about 4.6. The cheese curd is cut with curd knives using agitation. The resulting porous cheese curd particles are cooked to about 125° F. for approximately 2 hours. During the heating step, the dissolved gas is expended to generate pores in the cheese curd. The cut porous cheese curd is cooled to approximately 40° F. The porous curd is collected by filtering. The porous cottage cheese curd can be blended with a cottage cheese dressing. Generally, about 35 to about 45 percent dressing and about 55 to about 65 percent curd are used to form the cottage cheese.

EXAMPLE 4

This example illustrates the use of nitrogen gas to prepare the porous cottage cheese curd of this invention. The same procedures and ingredients were used as in Example 3 except nitrogen gas was used in place of carbon dioxide. In addition to the control (i.e., no gas source), samples were prepared using nitrogen gas pressures of 30 and 50 psi. In one experiment, the milk source was derived from a reconstituted non-fat dry milk and the nitrogen pressure was 30 psi during fermentation. Using the resulting curd, cottage cheese was prepared by blending the curd and dressing in a ribbon mixer.

The densities of the various cottage cheese curd samples were measured. The average values (with standard deviations) were based on 5 to 10 separate samples for each data point.

| Milk Source | N$_2$ (psi) | Density (g/cm$^3$) |
|---|---|---|
| Skim Milk | 0 (control) | 0.99 ± 0.01 |
| Skim Milk | 30 | 0.79 ± 0.02 |
| Skim Milk | 50 | 0.78 ± 0.04 |
| Reconstituted Non-Fat Dry Milk | 30 | 0.70 ± 0.03 |

This example clearly demonstrated the decreased density of the cottage cheese curd and, thus, the increased porosity of the curd, as the amount of nitrogen sparging is increased.

EXAMPLE 5

This examples illustrates the preparation of porous cottage cheese curd using carbonated water as the gas source. The following formulation was used to prepare a porous cottage cheese curd:

| Ingredient | Percentage | Weight (g) |
| --- | --- | --- |
| Non-Fat Dry Milk | 10.3 | 41.1 |
| Lactic acid Producing Starter | 6.0 | 24 |
| Carbonated Distilled Water | 83.7 | 334.95 |

The non-fat dried milk was reconstituted with carbonated distilled water in a closed chamber. The lactic-acid producing starter culture is added with stirring. The resulting mixture is heated to about 98° F. and allowed to ferment for about 5 hours. The pH of the resulting curd is about 4.6–4.7. The porous cheese curd is cut with curd knives using agitation. The resulting porous cheese curd particles are cooked to about 125° F. for approximately 2 hours, during this time any residual carbon dioxide should be driven off. The cut, porous cheese curd is cooled to approximately 40° F. The porous curd is collected by filtering. The porous cottage cheese curd can be blended with a cottage cheese dressing. Generally, about 35 to about 45 percent dressing and about 55 to about 65 percent curd are used to form the cottage cheese.

What is claimed is:

1. A process for producing an improved cottage cheese product having porous curd, said process comprising:

(a) blending a milk source and an acid source to form a fermentation mixture;

(b) heating the fermentation to between about 90 and about 100° F. and allow the mixture to ferment;

(c) injecting a gas source into the fermentation mixture during fermentation, whereby injected gas from the gas source forms pores in the curd, thereby forming a porous cottage cheese curd;

(d) cutting the porous cottage cheese curd with agitation;

(e) heating the cut porous cottage cheese curd to about 120 to about 130° F. for about 105 to about 140 minutes;

(f) cooling the cut porous cottage cheese curd to between about 40 and about 50° F.;

(g) draining the cooled porous cottage cheese curd; and (h) blending the drained porous cottage cheese curd with a cottage cheese dressing to form the improved cottage cheese, whereby the cottage cheese dressing can permeate into the pores of the porous cottage cheese curd.

2. The process as defined in claim 1, wherein the porous cottage cheese curd has a density of less than about 0.95 g/cm$^3$.

3. The process as defined in claim 1, wherein the porous cottage cheese curd has a density of less than about 0.79 g/cm$^3$.

4. The process as defined in claim 1, wherein the gas source is sodium bicarbonate and the gas is carbon dioxide formed in the fermentation mixture during fermentation.

5. The process as defined in claim 4, wherein the porous cottage cheese curd has a density of less than about 0.95 g/cm$^3$.

6. The process as defined in claim 4, wherein the porous cottage cheese curd has a density of less than about 0.79 g/cm3.

7. The process as defined in claim 1, wherein the gas source is air, carbon dioxide, or nitrogen injected into the fermentation mixture during fermentation.

8. The process as defined in claim 7, wherein the porous cottage cheese curd has a density of less than about 0.95 g/cm$^3$.

9. The process as defined in claim 7, wherein the porous cottage cheese curd has a density of less than about 0.79 g/cm$^3$.

10. The process as defined in claim 1, wherein the gas source is carbonated water added to the fermentation mixture.

11. The process as defined in claim 10, wherein the porous cottage cheese curd has a density of less than about 0.95 g/cm$^3$.

12. The process as defined in claim 10, wherein the porous cottage cheese curd has a density of less than about 0.79 g/cm$^3$.

* * * * *

UNITED STATES PATENT AND TRADEMARK OFFICE
CERTIFICATE OF CORRECTION

PATENT NO.     : 6,458,393 B1                                             Page 1 of 1
DATED          : October 1, 2002
INVENTOR(S)    : Lincourt et al.

It is certified that error appears in the above-identified patent and that said Letters Patent is hereby corrected as shown below:

<u>Title page,</u>
Item [75], Inventors, change "Ragendra" to -- Rajendra --.

Signed and Sealed this

Eleventh Day of March, 2003

JAMES E. ROGAN
*Director of the United States Patent and Trademark Office*